United States Patent [19]
Po

[11] Patent Number: 5,290,054
[45] Date of Patent: Mar. 1, 1994

[54] LINEAR DRIVE RECUMBENT CYCLE

[76] Inventor: Chungchiao J. Po, 1740 Summerwood Dr., Fullerton, Calif. 92633

[21] Appl. No.: 960,858

[22] Filed: Oct. 14, 1992

[51] Int. Cl.⁵ .............................................. B62M 1/04
[52] U.S. Cl. .................... 280/288.1; 280/253; 280/301
[58] Field of Search ............... 280/288.1, 281.1, 288.2, 280/301, 253

[56] References Cited

U.S. PATENT DOCUMENTS

| | | | |
|---|---|---|---|
| 2,587,790 | 3/1952 | Thalman | 280/301 |
| 4,878,684 | 11/1989 | Lemle | 280/288.1 |

FOREIGN PATENT DOCUMENTS

| | | | |
|---|---|---|---|
| 3737294 | 5/1989 | Fed. Rep. of Germany | 280/288.1 |
| 9009919 | 9/1990 | PCT Int'l Appl. | 280/288.1 |
| 191126 | 8/1937 | Switzerland | 280/281.1 |

OTHER PUBLICATIONS

SAE Technical Paper #840021, Evolution of Recumbent Bicycles and the Design of the Avatar Bluebell by D. G. Wilson, pp. 1 & 6. 1984.

*Primary Examiner*—Mitchell J. Hill

[57] ABSTRACT

A linear drive recumbent cycle (10) having linearly reciprocating pedals (68a,b) located approximately above the front wheel (14) in order to achieve a short wheel base recumbent bicycle design with the crank (42) located low between the wheels and with the seat located near or behind the center of gravity of the bike. The top extremities of a pair of pedal sliders (32a,b) are journalled for independent pendulum-type oscillation in a pedal-slider bracket (28) which is connected to a frame (12) through a front tube (30). The linearly reciprocating pedals (68a,b) are attached to the lower extremity of the pedal-sliders (32a,b) and are rotateably linked to the crank (42) through a pair of curved links (34a,b) so as to transfer power from the pedals (68a,b) to the crank (42). The pedal-sliders are short and straight whereby saving weight. The axis of reciprocative movement of the pedal-sliders (32a,b) cross above the axis of the crank (42) giving it an inherent tendency to rotate forward whereby eliminating crank kick back or crank getting stuck during use.

13 Claims, 2 Drawing Sheets 5,290,054

LINEAR DRIVE RECUMBENT CYCLE

BACKGROUND

1. Field of Invention

This invention relates to cycles, such as a bicycle, tricycle, motorcycle. More specifically, this invention relates to a recumbent bicycle. Even more specifically, this invention relates to a recumbent bicycle that uses a linearly drive to convert rotary pedal motion to linearly reciprocating pedal motion and with pedals positioned approximately above and on either side of the front wheel to create a short wheel base recumbent bicycle with the seat at or behind the center of gravity for stability. Even more particularly, this invention relates to a recumbent bicycle with an uniquely aligned linear drive that will eliminate crank kickbacks or crank getting stuck during use for a smooth operating linear drive recumbent bicycle. 2. Description of Prior Art Heretofore, recumbent bicycles are known in prior art and one typical embodiment of bicycles of this type is disclosed in U.S. Pat. Nos. 4,878,684 (E. W. Lemle, November 1989). As is clear from the prior art, it is desirable to construct a recumbent bicycle with an adjustable seat whose position is low with respect to the ground and with pedals located in front of the seat. Both seat and pedals are positioned along the frame of the bicycle. However, recumbent bicycle as illustrated in the foregoing reference have a wheel base that is substantially longer than conventional upright bicycles. Its subsequent weight and length make them slow and hard to maneuverable in tight places. Therefore, it is desirable that the wheel base of a recumbent bicycle be much shorter. To achieve a short wheel base, it is desirable for recumbent bicycles to have linearly reciprocating pedals of my invention so that the crank can remain low between the two wheels and not have to be moved very high up above the front wheel or moved in front of the front wheel.

The closest series of prior arts are disclosed in the SAE Technical paper Series 840021 called the "Evolution of Recumbent Bicycles and the Design of the Avatar Bluebell" by Dr. David Gordon Wilson of the Massachusetts Institute of Technology. The MacMillan Velocipede of about 1839 shown in FIG. 1 on page 1 uses a linear drive but the pedal-sliders interfere with the higher amplitudes of front-wheel steering movements. Also, its crank was connected directly to the axle giving it only one speed, thus making it too strenuous to ride. So, my invention modernizes the structure of the MacMillan Velocipede and made it work.

The second diagram of FIG. 15 on page 6 of the aforementioned technical paper shows a linear drive mechanism very similar to both my invention and the MacMillan Velocipede but differs in structure and have many disadvantages. And the author mentioned the disadvantages of his invention in the paragraph above and below the diagram. First, his pedal-sliders had to be long and curved to fulfill its intended purpose of shortening the wheel base. Since the pedal-sliders have to be strong enough to withstand high pedaling forces, his pedal-sliders design "weight far more . . . than the pedal that it replaced". This is due to the way that the pedal-sliders are attached to the frame. The advantage of my invention is that it allows the use of straight and much shorter pedal-sliders to cut weight. Further, the pedal-sliders of my invention can also be moved forward without extending the length of the pedal-sliders as in this prior art. This allows the accommodation of very long legged people.

Although the first paragraph on page 7 of the prior art had mentioned that the pedal's linear motion axis does not pass through the crank axis giving it a "quick-return motion". But it did not disclose in detail what it means or perhaps did not further investigate its unobvious advantage. The unobvious advantage of not having the pedal's linear motion axis pass through the axis of the crank had been known in piston engine design. So, this prior art did not invent this. And no other prior art explains this principle which prevents the bicycle crank from kicking back or getting stuck when used with a linear drive mechanism.

Therefore, the prior art of the above two paragraph had a structure that is not practical. In addition, it did not describe how and why will the advantage of not having the pedal's linear motion axis passing through the axis of the crank benefit it.

OBJECTS AND ADVANTAGES

Accordingly, several objects and advantages of my invention are to provide an improved recumbent cycle with a short wheel base made possible by placing linearly reciprocating pedals just above the front wheel. Particularly, several objects and advantages of my invention are to provide an improved recumbent bicycle with a short wheel base for much improved maneuverability in tight places by placing linearly reciprocating pedals just above the front wheel. More particularly, several objects and advantages of my invention are the use of straight and short pedal-slider arms that will reduce the weight of the linear drive mechanism. Even more particularly, several objects and advantages of my invention allows the linear drive mechanism to be placed further in front to accommodate long legged people without changing the length or weight of the pedal-slider arm as in prior art. Even more particularly, several objects and advantages of my invention are virtually eliminating crank kick back or crank getting stuck because of its uniquely aligned linear drive mechanism.

Further objects and advantages of my invention will become apparent from a consideration of the drawing and ensuing description of it.

DRAWING FIGURES

Figure 1:
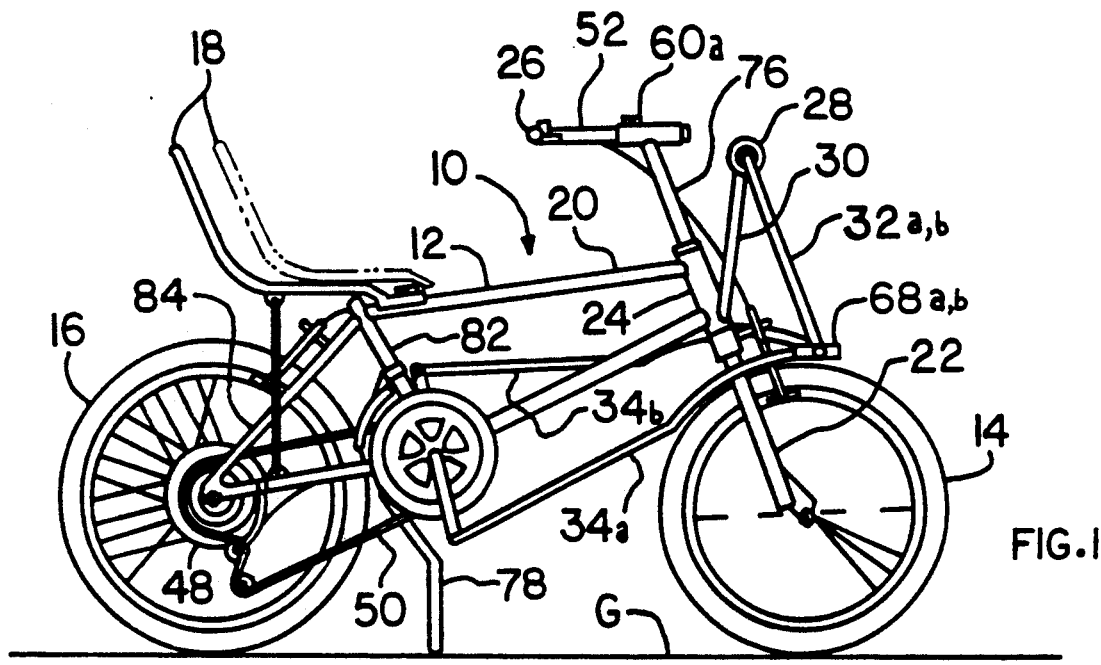
FIG. 1 is an elevational view of the preferred embodiment of a linear drive recumbent cycle according to my invention with certain portions of such bicycle being omitted for the sake of clarity.

REFERENCE NUMERALS IN DRAWINGS 10 linear drive recumbent cycle
12 frame
16 rear wheel
20 top tube
24 steering head
28 pedal-slider bracket
32a right pedal-slider
34a right link
36 caliper brake
42 crank 46 drive sprocket
50 chain
54 handlebar tubular portion
56b rear threaded holes
58b rear hole
60b rear fastening device
68a right pedal
74 handle
78 kickstand
82 upstanding support bar
86 chain support bar
11 linear drive mechanism
14 front wheel
18 seat
22 fork
26 adjustable handlebar
30 front tube
32b left pedal-slider
34b left link
38 lever
44 crank bracket
48 driven sprocket
52 handlebar rod member
56a front threaded holes
58a front hole
60a front fastening device
62 C-shape bracket
68b left pedal
76 stem
80 down tube
84 rear support bar
88 seat support rods

DESCRIPTION—FIGS. 1 TO 3

Figure 3:
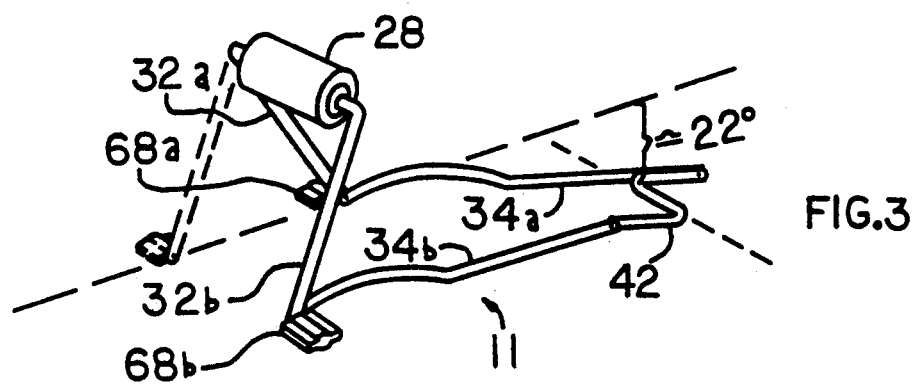
FIG. 3 is a fragmentary perspective view of the linear drive mechanism of the bicycle in FIG. 2.
Figure 2:
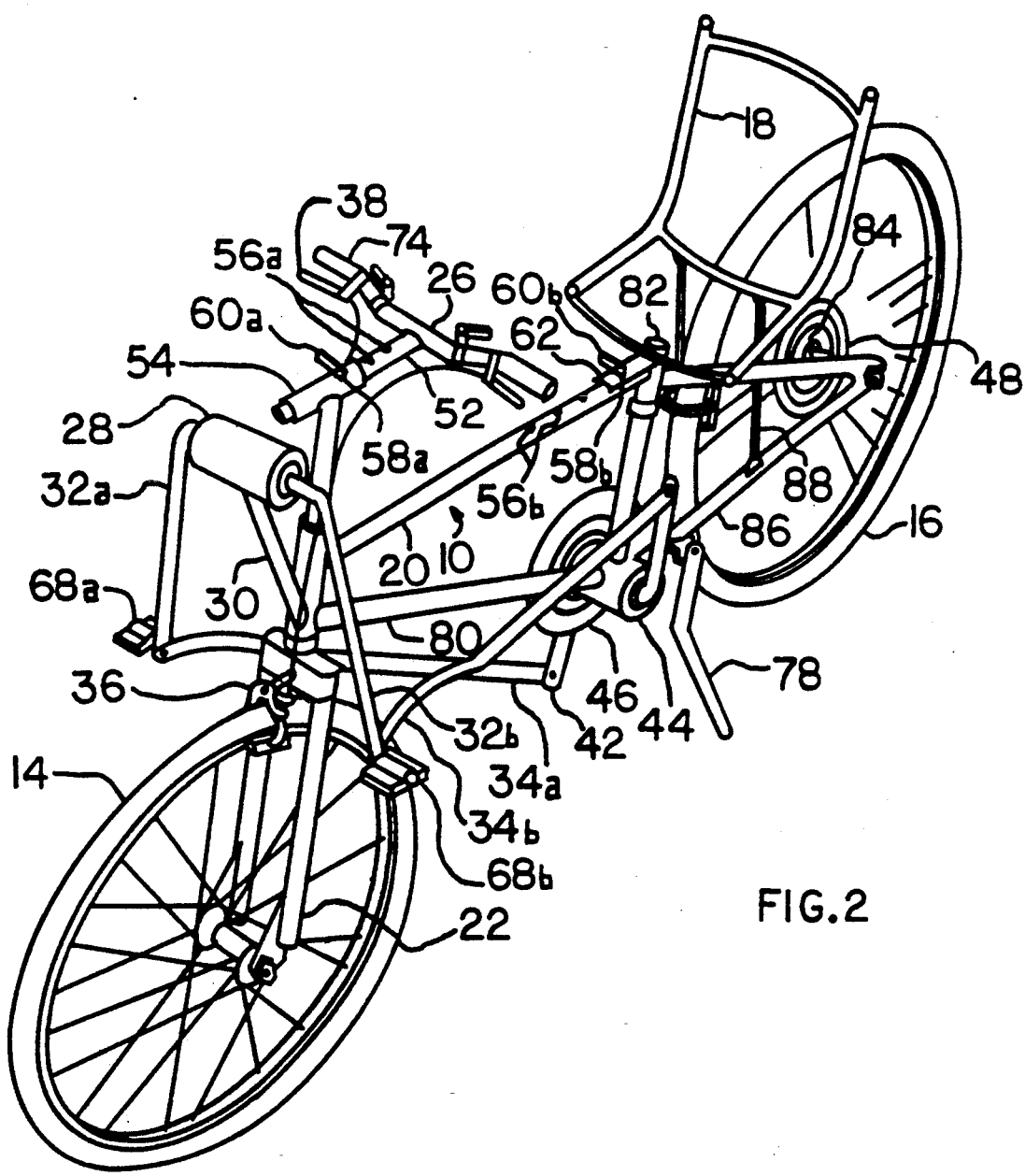
FIG. 2 is a perspective view of the linear drive recumbent cycle of FIG. 1.

A linear drive recumbent cycle according to the preferred embodiment of my invention is identified generally by reference numerals 10. Please note that from now on the linear drive recumbent cycle will simply be refer to as bicycle 10. The bicycle 10 includes a frame 12 which is supported for motion on a front wheel 14 and a rear wheel 16. The bicycle 10 is shown in FIG. 1 in an upright, rest position on the ground G, and further includes a seat 18. Only the frame portion of the seat 18 is illustrated in the drawing, it being understood that webbing material (not shown) will normally be attached to such frame portion. The bicycle 10 of FIG. 2 is the preferred embodiment fully described later. The bicycle 10 also include a linear drive mechanism 11 shown disconnected from bicycle 10 in FIG. 3 and it will be described fully hereinafter.

The front wheel 14 is rotatingly engaged between the arms of a fork 22, which includes a centrally positioned stem portion 76 that is journalled for rotation in a steering head 24 of frame 12. The steering of bicycle 10 is effected by the oscillation of stem portion 76 of fork 22 in head 24. And stem portion 76 is directly controlled by an adjustable handlebar 26 and it will be described fully hereinafter.

DESCRIPTION—FIG. 2

Front wheel 14 is provided with a caliper brake 36 which is actuated by a lever 38. Lever 38 is located at one of the extremities of handlebar 26. A flexible cable is provided to transmit braking force from lever 38 to caliper brake 36. Preferably, a similar braking mechanism, which is actuated by a lever at the other extremity of handlebar 26, is provided to apply braking force to rear wheel 16.

Handlebar 26 having on each opposed ends a handle 74 which are graspable by a rider's hands. Handlebar 26 also included a handlebar rod member 52 which may be tubular and which extends forewardly from handlebar 26. Rod 52 is slideably received in a handlebar tubular portion 54 of stem 76, and rod 52 is provided with a series of front threaded holes 56a extending therethrough and tubular portion 54 has a front hole 58a extending therethrough. The major diameter of holes 56a is less than the diameter of hole 58a. By proper positioning of rod 52, one or another of holes 56a is adapted to be brought in alignment with holes 58a, and they can be releasably secured in such a position by a hand removable front fastening device 60a. Fastening device 60a has a lever head and a threaded leg portion that extend through hole 58a and engages to be fastened to one of holes 56a. Thus, handlebar 26 can be positioned at any of a multiplicity of locations along tubular portion 54 for optimum spacing between handlebar 26 and seat 18 for the rider of bicycle 10, as determined by the size of such rider, as illustrated by solid line and dotted line of handlebar 26 in FIG. 1.

DESCRIPTION—FIG. 3

Bicycle 10 is provided with a straight right pedal-slider 32a and a straight left pedal-slider 32b, and their upper ends are journalled for a pendulum-type oscillation in a pedal-slider bracket 28 of a front tube 30 of frame 12. A right pedal 68a and a left pedal 68b are attached one at each of the lower ends of pedal-sliders 32a and 32b respectively. Bicycle 10 is also provided with a crank 42 which is journalled for rotation in a crank bracket 44 of frame 12. The individual length of pedal-sliders 32a and 32b should be about the same length as the diameter of crank 42. Further, pedal 68a is also rotateably attached to one of the extremities of crank 42 through a generally curved right link 34a to transmit the power from the pedal to the crank. Similarly, pedal 68b is also rotateably attached to the other extremity of crank 42 through a generally curved left link 34b. Right link 34a and left link 34b are curved up so that they do not interfere with the higher amplitudes of front-wheel steering movements. Links 34a and 34b are of such a length so that the pedal's linear motion axis (upper doted line) crosses above the crank axis (lower doted line) at an angle of about 22 degrees. So that crank 42 will have a natural tendency to rotate forward or in the same direction as wheels 14 and 16 without kicking back or getting stuck during use.

DESCRIPTION—FIG. 2

Crank 42 is provided with a drive sprocket 46. Rear wheel 16 of bicycle 10 is provided with a driven sprocket 48. Linearly reciprocating power, which is transmitted to pedals 68a and 68b by rider, is then converted by crank 42 into rotational energy. The same rotational energy is then transmitted to rear wheel 16 through a chain 50 in FIG. 1. Chain 50 is trained around sprocket 46 and sprocket 48 in FIG. 2. As illustrated, sprockets and chain drive of bicycle 10 is otherwise conventional multiple speed drive of the derailleur type.

The seat 18 consist of a generally horizontal bottom portion and a generally vertical backrest portion. The front of seat 18 is supported on a top tube 20 of frame 12. It is done by having a downwardly facing C-shape bracket 62 which is attached thereto, and bracket 62 partially surround bar 20. Bracket 62 has a rear hole 58b extending therethrough. Bar 20 of frame 12 is provided with a series of rear threaded holes 56b extending therethrough. The major diameter of holes 56b is smaller than the diameter of hole 58b of C-shape bracket 62. By proper positioning of seat 18 on bar 20, one or another of holes 56b is adapted to be brought in alignment with hole 58b, and seat 18 can be releasably secured in such position by a hand removable rear fastening device 60b which is similar to fastening device 60a. Fastening device 60b works by extending its leg portion through hole 58b and screws into one of holes 56b. The bottom rear cross member of seat 18 is supported on the split ends of a chain support bar 86 of frame 12 by two seat support rods 88. Thus, seat 18 can also be positioned at any of a multiplicity of locations along frame 12 for optimum spacing between seat 18 and pedals 68a,b for the rider of bicycle 10, as determined by the size of such rider, as illustrated by the solid and dotted lines of seat 18 in FIG. 1.

As is illustrated bicycle 10 is also provided with a kickstand 78 of conventional construction, and it is secured to bar 86 of frame 12. Further, frame 12 is provided with an upstanding support bar 82, and it extends from the bracket 44 to tube 20. A pair of spaced apart rear support bars 84 extends from bar 82 to engage the split end of bar 86 at the location of the axis of rear wheel 16. Thus, the rear part of frame 12 of bicycle 10 has a rigid, generally triangularly shaped portion which is made up of bar 82, bar 84 and bar 86. Similarly, the central part of frame 12 of bicycle 10 has a rigid generally triangularly shaped portion which is made up of 4 parts: bar 82, a down tube 80, tube 20 and head 24. As illustrated, the front part of frame 12 of bicycle 10 has a rigid generally straight portion that is a front tube 30.

OPERATION OF INVENTION—FIG. 3

Linear drive mechanism 11 with the pedal's linear motion axis that crosses above the crank axis has an unobvious advantage. The advantage is the virtual elimination of crank kick back and crank getting stuck during use. The direction of the line of action of the force or force line on the crankarm behind the axis of crank 42 generally follows the straight portion of links 34a,b. Notice that link 34a is parallel with one side of crank 42 before link 34b has straightened with the other side of crank 42. This phenomenen is the result of having the pedal's linear motion axis cross above the crank axis. So, the aforementioned force line will be lifted up above the axis of crank 42 as link 34b becomes straightened with crank 42. The lifting upwards of this force line insures crank 42 will always have a powerful tendency to rotate forward when power is applied. Linear drive mechanism 11 must have this unique alignment or it would not work on a bicycle. It would not work because crank 42 would frequently get stuck or rotate backwards during use.

Another way of explaining the aforementioned unobvious advantage is that the drive stroke of the first pedal briefly overlapses with the drive stroke of the second pedal. As it is clear also from the FIG. 3, the link 34a is straight with one side of crank 42 indicating pedal 68a is at the beginning of the drive stroke. But link 34b is not yet straightened with the other side of crank 42 indicating pedal 68b is not yet at the end of its drive stroke. So, as crank 42 continue to rotate forward both pedals travels forward in the same direction for a small fraction of the length of the drive strokes. So the last segment of first drive stroke would carry the next drive stroke pass its starting point where rotation could either go forward or backward or get stuck. The larger the angle (up to around 35 deg) between the pedal's linear motion axis and the axis of crank 42 the larger this drive stroke overlap will be. And relatedly the longer the total length of a drive stroke will be. Pedals 68a and 68b resumes reciprocating motion right after the brief drive stroke overlap has ended. The first paragraph on page 7 of the SAE technical paper 840021 mentioned in the "background-discussion of Prior Art" section, speak something of a "quick return motion". This drive stroke overlap phenomenon which I had described in this paragraph may be the same thing as the "quick return motion" of that prior art. But that prior art did not disclose how it works in any detail.

CONCLUSION, RAMIFICATIONS AND SCOPE OF INVENTION

Thus the reader will see that the linear drive recumbent bicycle provide a compact and smooth operating linear drive recumbent bicycle.

While my above description contains many specificities, these should not be construed as limitations on the scope of the invention but rather as an exemplication of a few embodiments thereof. Many other variations are possible. For example, linear drive mechanism 11 of FIG. 3 can have other add-ons such as damping devices attached at the end of links 34a and 34b to alleviate the effect of drive stroke overlap.

Accordingly, the scope of the invention should be determined not by the embodiments illustrated, but by the appended claims and their legal equivalents.

I claim:

1. A linear drive recumbent cycle comprising:
   a front wheel;
   a rear wheel;
   a frame extending between said front and rear wheel to enable said frame to roll along a surface, said frame also comprising a steering head; said front wheel being journalled in said steering head for oscillation about a generally vertically extending axis so as to allow steering of said cycle;
   a plurality of generally straight pedal-slider means being journalled in said frame for pendulum type oscillation about a generally horizontal axis, said pedal-slider means being attached to said frame so as to support said pedal-slider means;
   a crank being journalled in said frame for rotation about a generally horizontally extending axis;
   a plurality of pedals attached to said pedal-slider means, said pedals travel along a linear motion axis; said pedal-slider means journaled in said frame at an upper end which is shifted a distance away from said crank so that said linear motion axis of said pedals crosses above the axis of said crank;
   a plurality of generally curved link means for linking said pedals with said crank to enable the transmission of power from said pedals to said crank.

2. The cycle of claim 1 wherein said crank comprising drive sprockets, wherein said rear wheel also comprising driven sprockets, and further comprising a chain for conveying rotational energy from said crank to said rear wheel for propelling said frame along said surface.

3. The cycle of claim 2 wherein said chain being capable of moving from one set of said sprockets to another.

4. The cycle of claim 1 wherein said frame also comprising a front tube, a top tube, a down tube, a upstanding support bar, a rear support bar and a chain support bar; said front tube extending forward and upward from said steering head to support said pedal-slider means; said top tube and said down tube both of which extends back from said steering head; top of said upstanding support bar is connected to said top tube, bottom of said upstanding support bar is connected to said down tube; said rear support bar extends back from top of said upstanding support bar, said chain support bar extends back from bottom of said upstanding support bar, said rear support bar and said chain support bar having each a split portion that are joined to each other at the rear extremity and also to said rear wheel; said rear support bar and said chain support bar being connected to one another in a rigid configuration.

5. The cycle of claim 4 further including a handlebar, said handlebar comprises a handlebar rod member, a fork comprises a handlebar tubular portion, wherein said handlebar tubular portion further comprises a front fastener, wherein said front fastener has a threaded portion whereby said handlebar rod member can be secured to said handlebar tubular portion in a multiplicity of positions.

6. The cycle of claim 5 further including a seat spaced from said pedal and comprising a generally horizontal bottom portion and a generally vertical backrest portion, said seat being supported on said frame.

7. The cycle of claim 6 wherein said seat further comprises a downwardly facing C-shape bracket, said C-shape bracket partly surrounding said top tube whereby supporting the front part of said seat, and said C-shape bracket comprises a rear hole extending therethrough, wherein said top tube comprises a plurality of spaced apart rear threaded holes extending therethrough, and each of said rear threaded holes is capable of being aligned with said rear hole of said C-shape bracket, wherein said C-shape bracket further includes a rear fastener which comprises an externally threaded leg portion, said rear fastener inserts through said rear hole and threads into one of said rear threaded holes whereby securing said seat in one of the multiplicity of positions, and said seat further including a plurality of seat support rods rotateably secured between said seat and the split portion of said chain support bar.

8. A linear drive recumbent cycle comprising:
a front wheel;
a rear wheel;
a frame extending between said front and rear wheel to enable said frame to roll along a surface, said frame also comprising a steering head; said front wheel being journalled in said steering head for oscillation about a generally vertically extending axis so as to allow steering of said cycle;
a plurality of generally straight pedal-slider means being journalled in said frame for pendulum type oscillation about a generally horizontal axis, a front tube extending forward and upward from said steering head to support said pedal-slider means;
a crank being journalled in said frame for rotation about a generally horizontally extending axis;
a plurality of pedals attached to said pedal-slider means, said pedals travel along a linear motion axis; said pedal-slider means journaled in said frame at an upper end which is shifted a distance away from said crank so that said linear motion axis of said pedals crosses above the axis of said crank;
a plurality of generally curved link means for linking said pedals with said crank to enable the transmission of power from said pedals to said crank;
a kickstand secured to said frame;
a handle bar having a handle on both ends which are graspable by a rider's hands, said handle bar being attached to a fork, the top of said fork being journalled in said steering head for oscillation, the bottom of said fork being connected to said front wheel;
a brake for applying braking force to said front wheel and said rear wheel, and further including a lever for operating said brake, said lever being attached to said handle bar, wherein said brake further including a flexible cable extending from said lever to said brake.

9. The cycle of claim 8 wherein said crank comprising drive sprockets, wherein said rear wheel also comprising driven sprockets, and further comprising a chain for conveying rotational energy from said crank to said rear wheel for propelling said frame along said surface.

10. The cycle of claim 9 wherein said chain being capable of moving from one set of said sprockets to another.

11. The cycle of claim 8 wherein said frame also comprising a top tube, a down tube, a upstanding support bar, a rear support bar and a chain support bar; said top tube and said down tube both of which extends back from said steering head; top of said upstanding support bar is connected to said top tube, bottom of said upstanding support bar is connected to said down tube; said rear support bar extends back from top of said upstanding support bar, said chain support bar extends back from bottom of said upstanding support bar, said rear support bar and said chain support bar having each a split portion that are joined to each other at the rear extremity and also to said rear wheel; said top tube, said down tube, said upstanding support bar, said rear support bar and said chain support bar being connected to one another in a rigid configuration.

12. The cycle of claim 11 further including a seat spaced from said pedals and comprising a generally horizontal bottom portion and a generally vertical backrest portion, said seat being supported on said frame.

13. The cycle of claim 12 wherein said seat further comprises a downwardly facing C-shape bracket, said C-shape bracket partly surrounding said top tube whereby supporting the front part of said seat, and said C-shape bracket comprises a rear hole extending therethrough, wherein said top tube comprises a plurality of spaced apart rear threaded holes extending therethrough, and each of said rear threaded holes is capable of being aligned with said rear hole of said C-shape bracket, wherein said C-shape bracket further includes a rear fastener which comprises an externally threaded leg portion, said rear fastener inserts through said rear hole and threads into one of said rear threaded holes whereby securing said seat in one of the multiplicity of positions, and said seat further including a plurality of seat support rods rotateably secured between said seat and the split portion of said chain support bar.

* * * * *